United States Patent [19]
Tanaka

[11] Patent Number: 6,092,352
[45] Date of Patent: Jul. 25, 2000

[54] METHOD OF AND APPARATUS FOR PACKAGING FILM CARTRIDGE

[75] Inventor: Koozoo Tanaka, Minamiashigara, Japan

[73] Assignee: Fuji Photo Film Co., Ltd., Kanagawa-ken, Japan

[21] Appl. No.: 09/257,211

[22] Filed: Feb. 25, 1999

[30] Foreign Application Priority Data

Mar. 17, 1998 [JP] Japan .................................. 10-066871

[51] Int. Cl.[7] .............................. B65B 7/28; B65B 63/04
[52] U.S. Cl. ............................... 53/430; 53/471; 53/118; 53/253; 53/258; 29/806
[58] Field of Search ............................ 53/430, 471, 118, 53/253, 255, 258, 530; 29/806

[56] References Cited

U.S. PATENT DOCUMENTS

| | | | |
|---|---|---|---|
| 3,714,761 | 2/1973 | Herford et al. | 53/253 |
| 4,115,913 | 9/1978 | Moriya et al. | 53/430 |
| 5,669,205 | 9/1997 | Rice et al. | 53/430 |
| 6,018,929 | 2/2000 | Suzuki et al. | 53/118 |

FOREIGN PATENT DOCUMENTS 9-5947  1/1997  Japan .............................. G03C 3/00

*Primary Examiner*—John Sipos
*Attorney, Agent, or Firm*—Sughrue, Mion, Zinn, Macpeak & Seas, PLLC

[57] ABSTRACT

A packaging apparatus includes a film cartridge inserting mechanism has a case holder for holding case nonrotatably in an assembling position, a film cartridge holder for holding the film cartridge nonrotatably and inserting the film cartridge into the case, and a guide mechanism having a guide cylinder for guiding the film cartridge therethrough into the case, the guide cylinder being rotatable to hold a film leader of a rolled photographic film housed in the film cartridge, around an outer circumferential surface of the film cartridge. The film cartridge with the rolled photographic film housed therein can automatically be inserted smoothly into the case through the rotating guide cylinder. The packaging apparatus is relatively simple in structure because it has no mechanisms for rotating the film cartridge and the case.

9 Claims, 11 Drawing Sheets

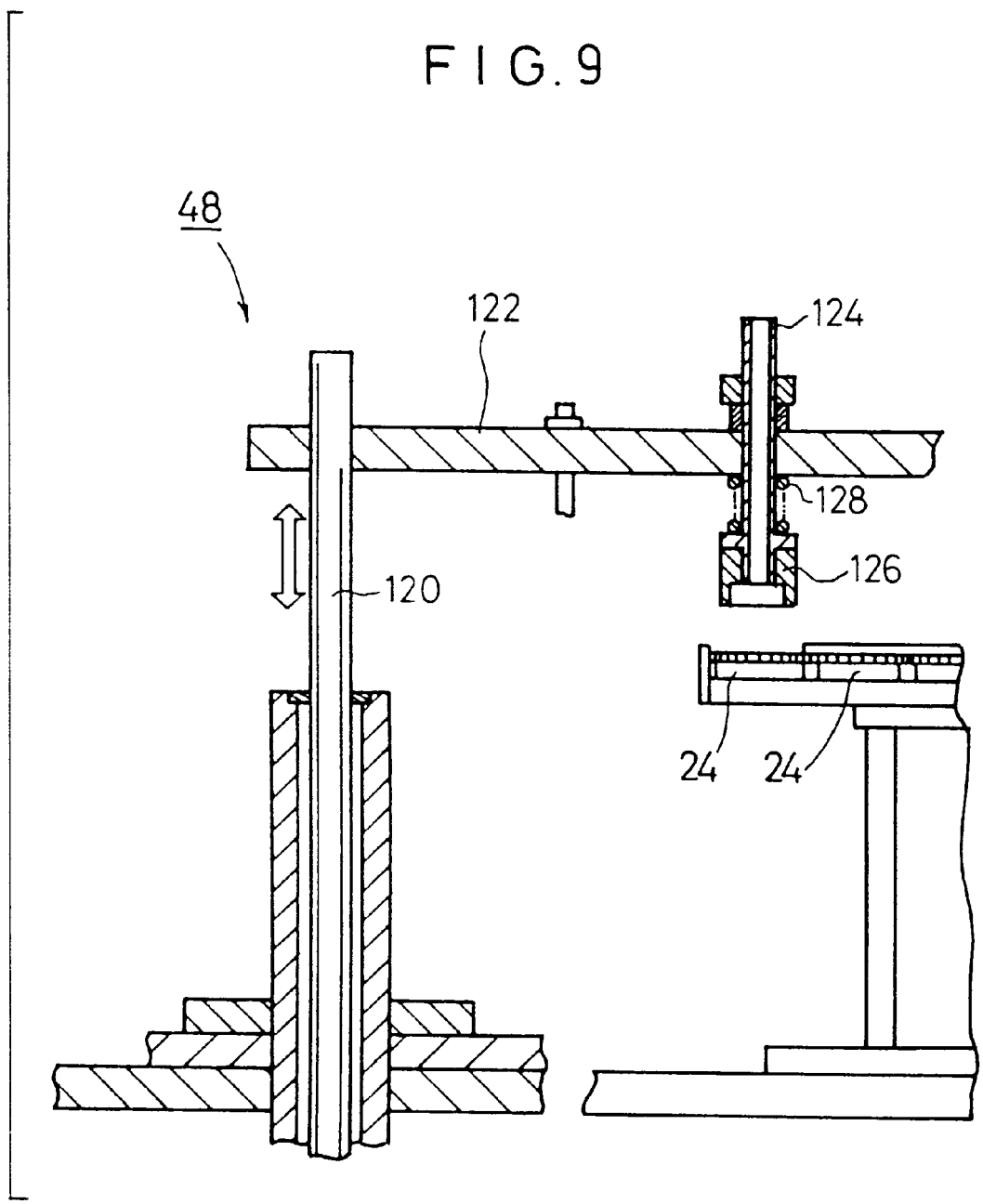
F I G. 9

METHOD OF AND APPARATUS FOR PACKAGING FILM CARTRIDGE

BACKGROUND OF THE INVENTION

1. Field of the Invention

The present invention relates to a method of and an apparatus for packaging a film cartridge, which houses a rolled photographic film therein, by automatically inserting the film cartridge into a case.

2. Description of the Related Art

Usually, a photographic film is produced and packaged by preparing a photographic film of given size cut from an elongate photographic film, rolling the photographic film, placing the rolled photographic film into a film cartridge, and inserting the film cartridge into a case (outer package). These separate processes have been carried out by respective individual apparatus.

Generally, the rolled photographic film which is housed in the film cartridge has an outer end called "film leader" projecting a certain length out of the film cartridge through a slit defined in the wall of the cartridge housing. When the film cartridge is loaded in a camera, the film leader is attached to a film take-up spool in the camera and wound on the film take-up spool to pull the photographic film from the film cartridge for making the photographic film ready for exposures. Since it is necessary to keep the film leader wound reliably on the outer circumferential surface of the film cartridge upon insertion into the case, the process of inserting the film cartridge into the case is considerably complex.

There has heretofore been known a method of and an apparatus for automatically inserting a film cartridge which houses a rolled photographic film therein into a case, as disclosed in Japanese laid-open patent publication No. 9-5947, for example. According to the disclosed method, at the same time that the film cartridge is axially moved, one of the film cartridge and the case is rotated about the longitudinal axis of the film cartridge, and the film leader projecting from the housing of the film cartridge is wound around the housing due to relative movement of the film leader and a rim of the case upon engagement therebetween, allowing the film cartridge and the film leader to be easily inserted into the case.

However, because the film cartridge is inserted into the case while one of the film cartridge and the case is being rotated, an inner wall surface of the case, which is made of plastic, tends to be rubbed or frictionally contacted by the film leader that projects out of the housing of the film cartridge. Therefore, the inner wall surface of the case is abraded by an edge of the photographic film and edges around perforations defined in the photographic film, thus scraping off minute plastic particles or fragments which are liable to be attached to the photographic film. In addition, the apparatus for automatically inserting the film cartridge into the case is relatively complicated because of the need for a mechanism for rotating one of the film cartridge and the case upon insertion of the film cartridge into the case.

SUMMARY OF THE INVENTION

It is, therefore, a major object of the present invention to provide a method of and an apparatus for packaging a film cartridge by automatically the film cartridge smoothly into a case while reliably preventing the film cartridge and the case from rubbing against each other, with a relatively simple arrangement.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9 is a fragmentary perspective view of a case cap loading mechanism of the packaging apparatus;

DESCRIPTION OF THE PREFERRED EMBODIMENT

Figure 1:
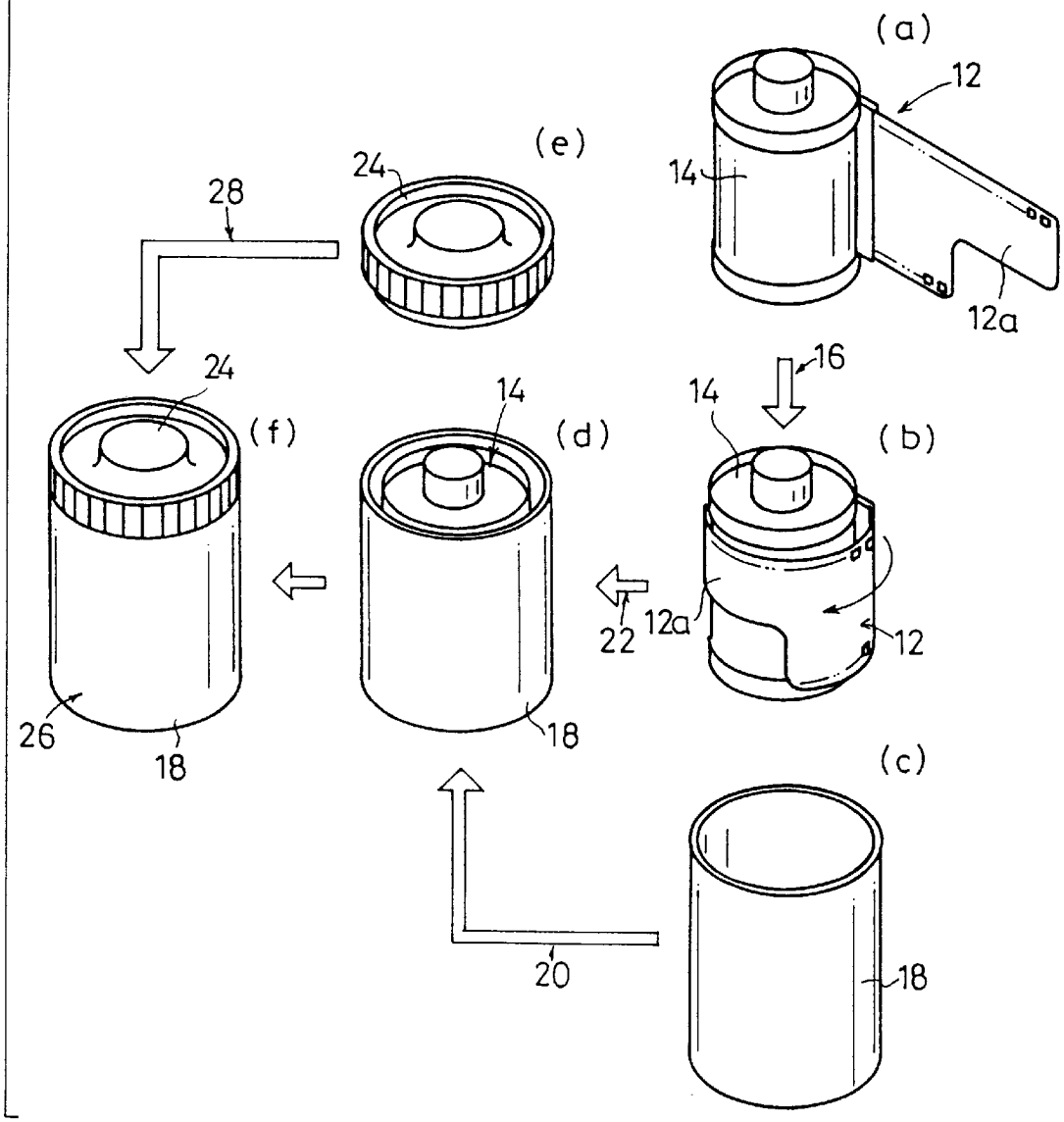
FIG. 1 is a perspective view schematically illustrating a method of packaging a film cartridge according to the present invention.
Figure 2:
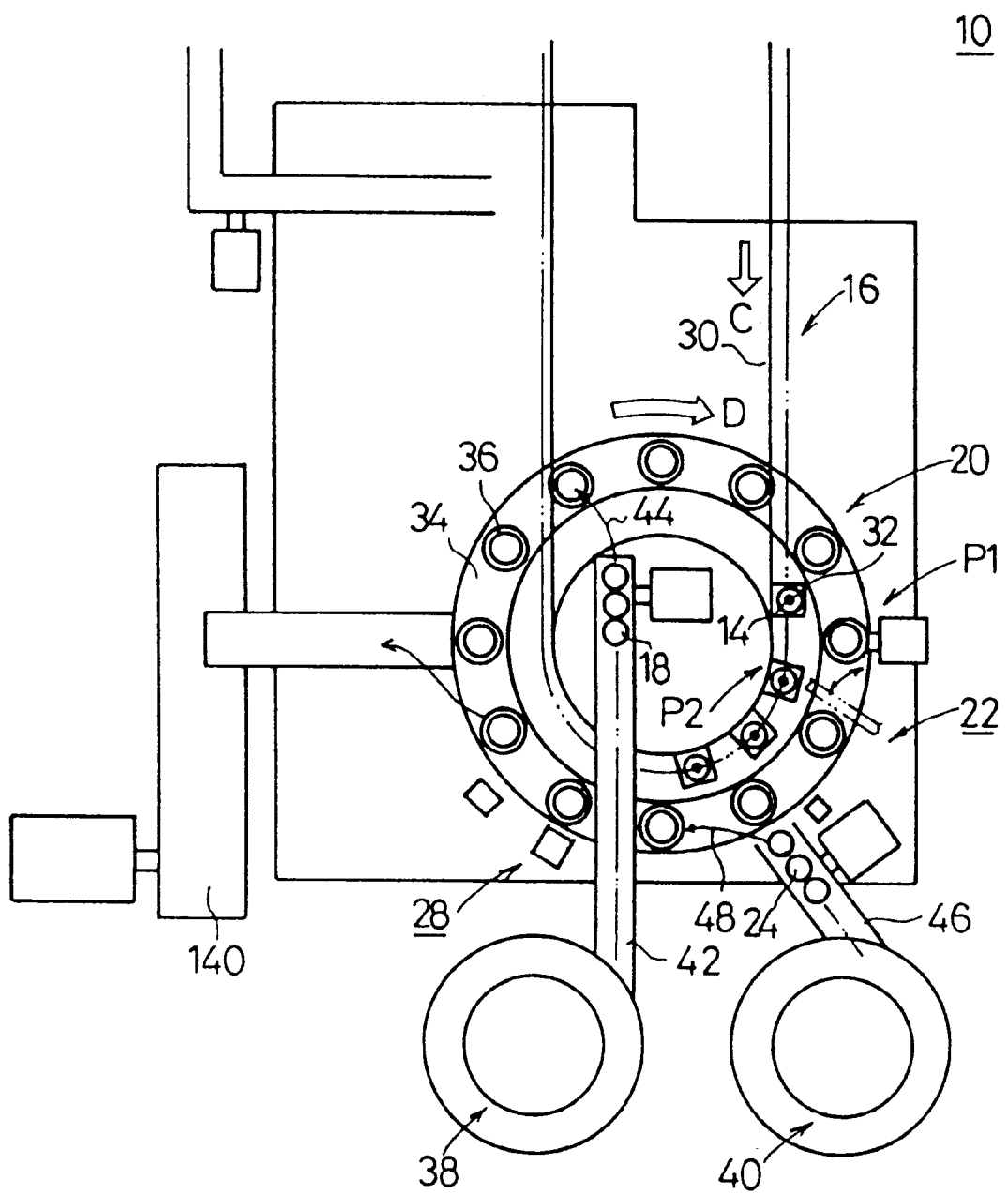
FIG. 2 is a schematic plan view of a packaging apparatus for carrying out the method of packaging a film cartridge as illustrated in FIG. 1.

As shown in FIGS. 1 and 2, a packaging apparatus 10 comprises a first feed mechanism 16 for successively feeding film cartridges 14 each housing a rolled photographic film 12 of given size, a second feed mechanism 20 for supplying a case 18, in which a film cartridge 14 is to be inserted, to a position below an assembling position P1, a film cartridge inserting mechanism 22 for holding and delivering the film cartridge 14 to the assembling position P1, simultaneously winding an outer end or film leader 12a of the photographic film 12 projecting out of the film cartridge 14 around an outer circumferential surface of the film cartridge 14, and inserting the film cartridge 14 into the case 18 in the assembling position P1, and a case cap installing mechanism 28 for installing a case cap 24 on an open end of the case 18, in which the film cartridge 14 has already been inserted, thereby to produce a packaged product 26.

Figure 3:
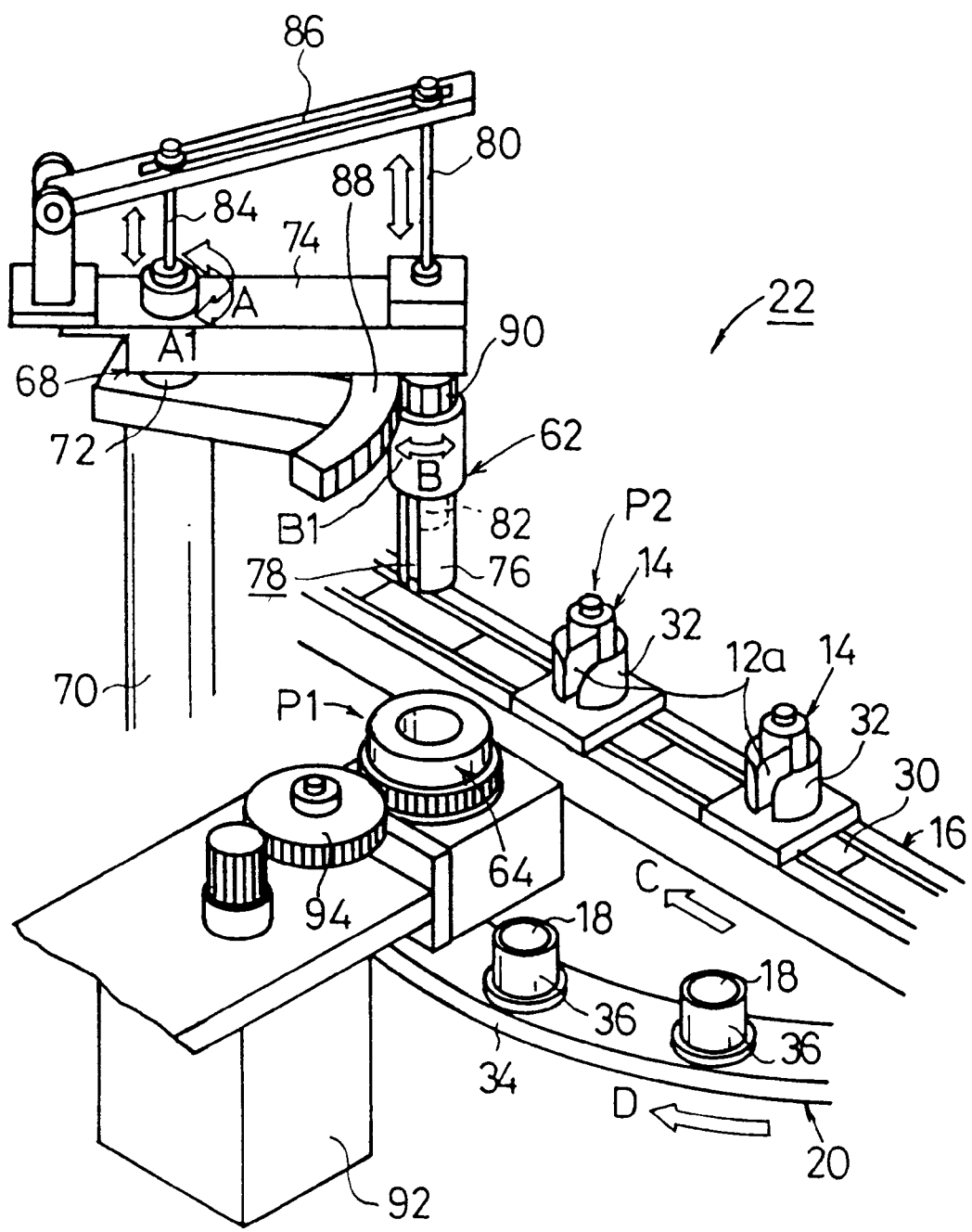
FIG. 3 is a perspective view of a film cartridge inserting mechanism of the packaging apparatus.
Figure 4:
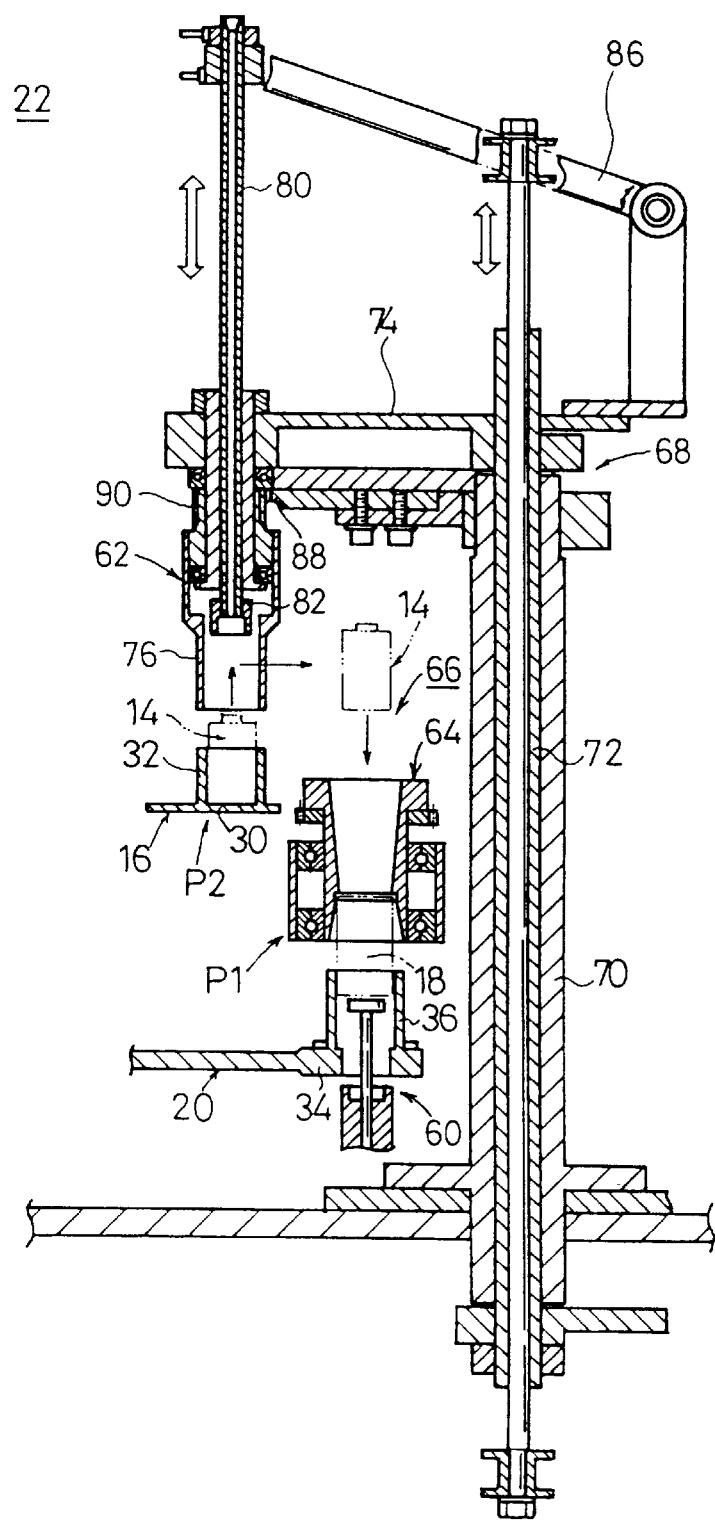
FIG. 4 a fragmentary vertical cross-sectional view of the film cartridge inserting mechanism.

As shown in FIGS. 2 through 4, the first feed mechanism 16 includes a feed conveyor 30 having a plurality of buckets 32 fixed thereto at given spaced intervals for holding respective film cartridges 14. The assembling position P1 is on the index table 34. The second feed mechanism 20 has an index table 34 rotatably positioned coaxially with a shaft around which the feed conveyor 30 is trained. The index table 34 has a plurality of buckets 36 mounted at given spaced intervals thereon in a circular pattern. Both the feed conveyor 30 and the index table 34 are movable intermittently.

As shown in FIG. 2, the index table 34 is surrounded by the film cartridge inserting mechanism 22, the case cap installing mechanism 28, a case feeder 38, a case cap feeder 40, a case loading mechanism 44 for delivering a case 18 supplied to a chute 42 of the case feeder 38 to a bucket 36, and a case cap loading mechanism 48 for placing a case cap 24 fed to a chute 46 of the case cap feeder 40 onto a case 18 which houses a film cartridge 14 therein.

As shown in FIGS. 3 through 6, the film cartridge inserting mechanism 22 comprises a case holder 60 for holding a case 18 nonrotatably in the assembling position P1, a film cartridge holder 62 for removing a film cartridge 14 from a film cartridge removing position P2 on the feed conveyor 30, delivering the removed film cartridge 14 to the assembling position P1, thereafter holding the film cartridge 14 nonrotatably, and inserting the film cartridge 14 into the case 18 which is held nonrotatably in the assembling position P1, and a guide mechanism 66 having a hollow guide cylinder 64 for guiding the film cartridge 14, the guide cylinder 64 being rotatable upon delivery of the film cartridge 14 into the case 18, for holding the film leader 12a projecting from the film cartridge 14 against the outer circumferential surface of the film cartridge 14.

As shown in FIGS. 3 and 4, the film cartridge inserting mechanism 22 also has a displacing mechanism 68 for displacing the film cartridge holder 62 between the film cartridge removing position P2 and the assembling position P1. The displacing mechanism 68 has a vertical rotatable shaft 72 supported in a vertical support tube 70 and rotatable about a vertical axis in the directions indicated by the arrow A by an actuator (not shown). The rotatable shaft 72 has an upper end fixed to an end of a swing arm 74 which supports a vertical hollow cylinder 76 rotatably on an opposite end thereof. The vertical hollow cylinder 76 has a vertical slit 78 defined in a lower end portion thereof and extending axially, the vertical slit 78 having a predetermined width in the circumferential direction of the vertical hollow cylinder 76.

The film cartridge holder 62 is vertically movably disposed in the vertical hollow cylinder 76 and has a vertical suction shaft 80 whose upper end communicates with a vacuum source (not shown). The film cartridge holder 62 also has a suction cup 82 fixed to the lower end of the vertical suction shaft 80. A vertically movable rod 84 extends through the rotatable shaft 72 and has an upper end operatively engaging a swing bar 86 which has an end pivotally supported by the swing arm 74 and an opposite distal end operatively coupled to the upper end of the suction shaft 80.

A sector gear 88 is fixed to the support tube 70 immediately below the swing arm 74 and has its center of curvature aligned with the axis of the rotatable shaft 72 about which the swing arm 74 is angularly movable. The sector gear 88 is held in mesh with a gear 90 on an upper end of the vertical hollow cylinder 76. The guide cylinder 64 is located in the assembling position P1 and disposed above a bucket 36 on the index table 34, for positioning a case 18 pushed upwardly from the bucket 36 and guiding a film cartridge 14 lowered from above the case 18 thus positioned. The guide cylinder 64 is rotatable about its vertical axis by a gear train 94 (see FIG. 3) operatively coupled to a motor 92.

Figure 5:
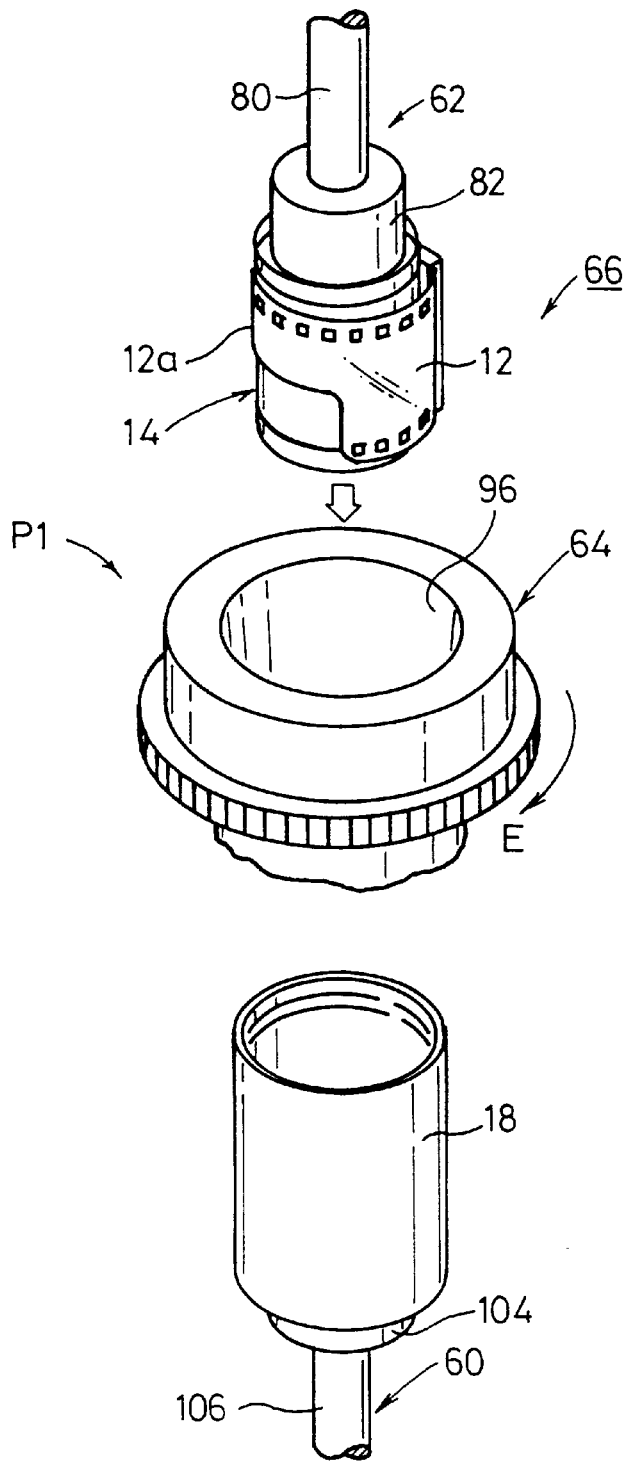
FIG. 5 is an enlarged perspective view of a guide mechanism of the film cartridge inserting mechanism.
Figure 6:
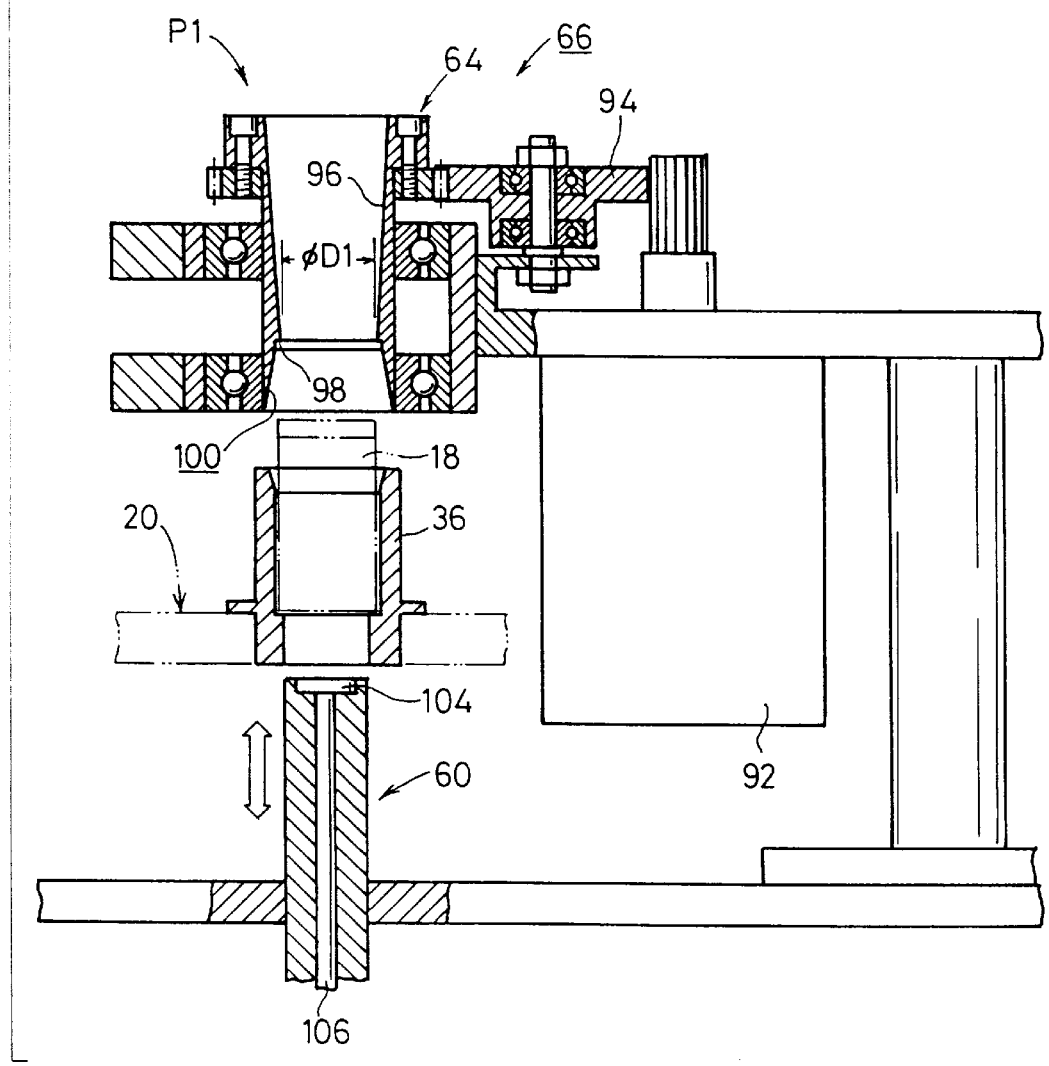
FIG. 6 is an enlarged vertical cross-sectional view of the guide mechanism.
Figure 7:
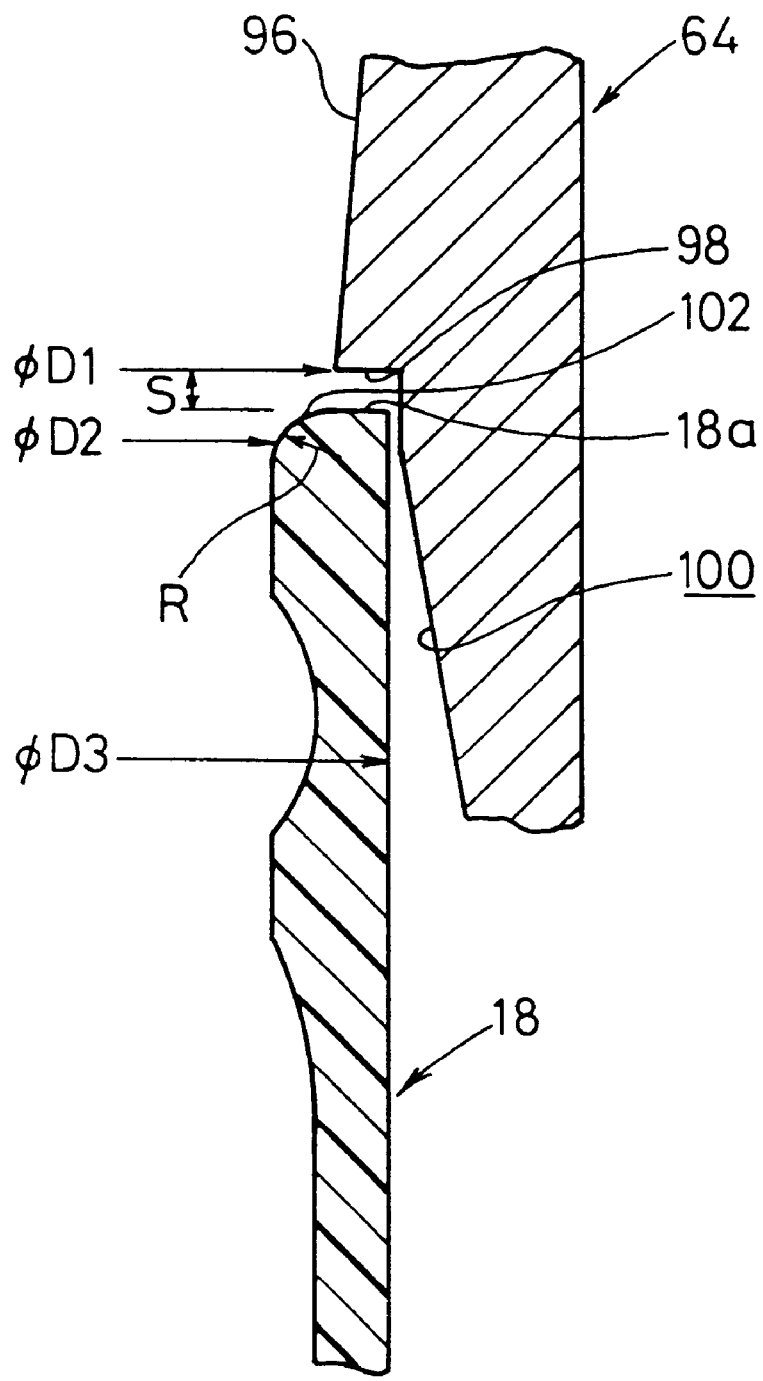
FIG. 7 is an enlarged fragmentary vertical cross-sectional view of a guide cylinder of the guide mechanism and a case.

As shown in FIG. 6, the guide cylinder 64 has a downwardly tapered inner circumferential surface 96 for guiding the film leader 12a (see FIG. 5) of a photographic film 12 projecting from a film cartridge 14 along the outer circumferential surface of the film cartridge 14. The downwardly tapered inner circumferential surface 96 has an upper end positioned at the upper open end of the guide cylinder 64. The guide cylinder 64 also has an upwardly tapered opening 100 defined therein coaxially with and extending downwardly of the tapered inner circumferential surface 96 in communication therewith. The upwardly tapered opening 100 has an upper end connected to the lower end of the downwardly tapered inner circumferential surface 96 via an annular step 98 which faces downwardly, and a lower end positioned at the lower open end of the guide cylinder 64. As shown in FIG. 7, when a case 18 placed on the case holder 60 is located in an uppermost position in the upwardly tapered opening 100, the case 18 has its upper end 18a vertically spaced from the annular step 98 by a predetermined clearance S. The clearance S is preferably in the range from 0.5 mm to 1.5 mm, and more preferably in the range from 0.5 mm to 1.0 mm.

The downwardly tapered inner circumferential surface 96 is inclined to the vertical axis of the guide cylinder 64 by an angle ranging from 1° to 11°. The lower end of the downwardly tapered inner circumferential surface 96 has a diameter D1 which is greater than the inside diameter D2 of the case 18 and smaller than the outside diameter D3 of the case 18. The case 18 includes a radially inner round surface 102 which is convexly curved downwardly in the radially inward direction from the upper end 18a toward an inner circumferential surface of the case 18. The lower end of the radially inner round surface 102 which is joined to the inner circumferential surface of the case 18 has the same diameter as the inside diameter D2 of the case 18. The radially inner round surface 102 has a radius of curvature which is 0.5 mm, for example.

As shown in FIG. 6, the case holder 60 has a vertically movable suction base 104 for attracting a case 18 under suction and delivering the attracted case 18 from the second feed mechanism 20 to the assembling position P1. The vertically movable suction base 104 is connected to a suction shaft 106 which communicates with a vacuum source (not shown). The suction shaft 106 is vertically movable by an actuator (not shown).

Figure 8:
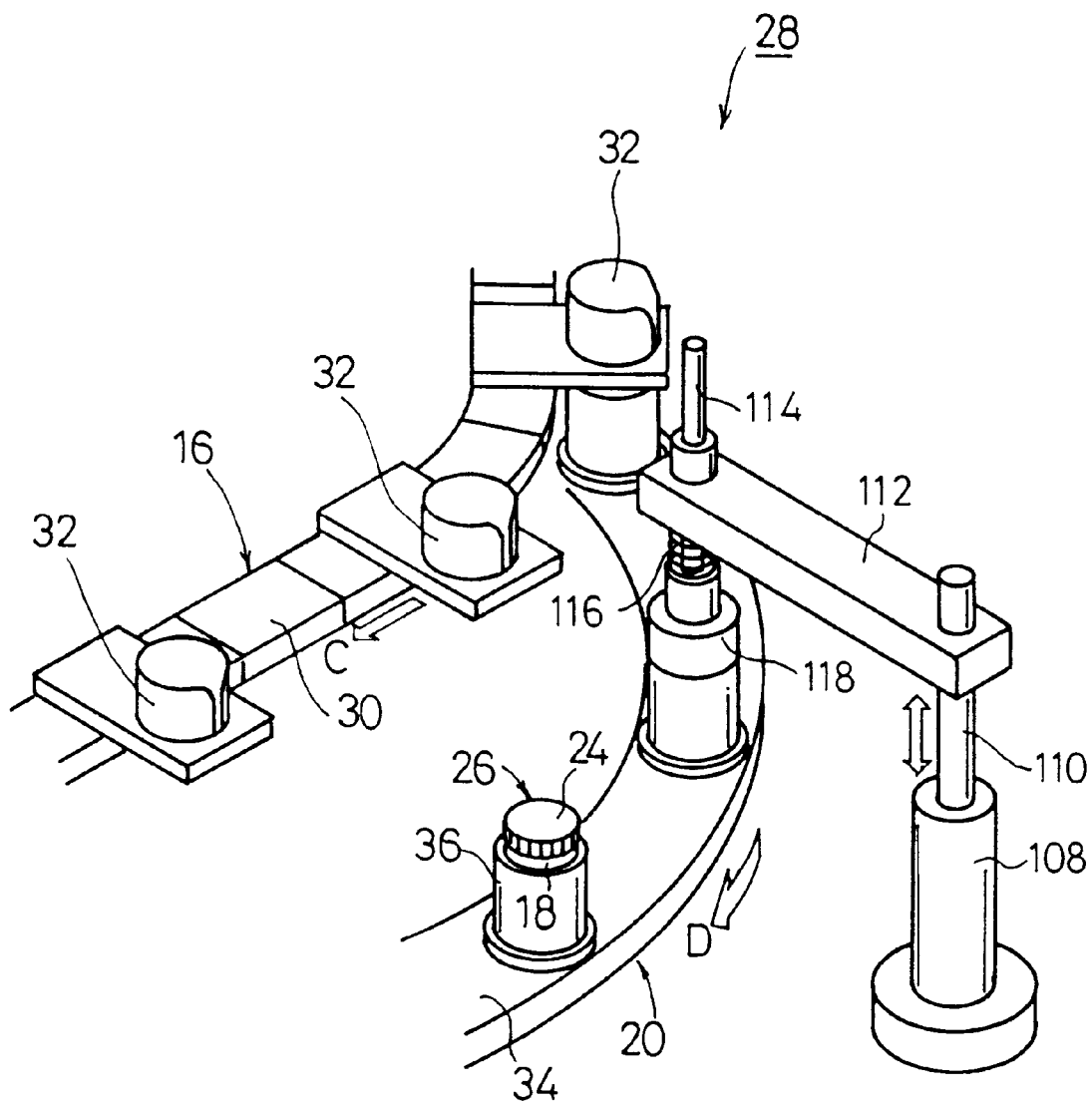
FIG. 8 is a fragmentary perspective view of a case cap installing mechanism of the packaging apparatus.

As shown in FIG. 8, the case cap installing mechanism 28 has a vertical shaft 110 supported in a cylindrical support 108 and vertically movable by an actuator (not shown). A horizontal arm 112 has an end fixed to the upper end of the shaft 110 and an opposite end on which a vertical rod 114 is vertically movably supported. The vertical rod 114 is normally biased downwardly by a spring 116 which acts between the horizontal arm 112 and the vertical rod 114. A presser 118 is mounted on the lower end of the vertical rod 114.

Each of the case loading mechanism 44 and the case cap loading mechanism 48 may be of any of various known structures. For example, the case loading mechanism 44 has grip fingers for gripping and moving the open end of a case 18. As shown in FIG. 9, the case cap loading mechanism 48 has a vertical shaft 120 which is vertically movable and rotatable about its own axis. A horizontal arm 122 has an end fixed to the upper end of the shaft 120 and an opposite end on which there is vertically movably supported a vertical suction rod 124 communicating with a vacuum source (not shown). A suction cup 126 is connected to the lower end of the suction rod 124 in communication therewith, and normally biased downwardly by a spring 128 which acts between the horizontal arm 122 and the suction rod 124.

Operation of the packaging apparatus 10 to carry out a packaging method according to the present invention will be described below.

Film cartridges 14, each housing a rolled photographic film 12, are placed respectively in the buckets 32 on the feed conveyor 30 of the first feed mechanism 16, as shown in FIG. 2. When the first feed mechanism 16 is actuated to move the feed conveyor 30 in the direction indicated by the arrow C, the film cartridges 14 in the buckets 32 are successively fed, one at a time, to the film cartridge removing position P2 (see FIG. 1 at (a) and FIG. 3).

Cases 18 are supplied in an array along the chute 42 from the case feeder 38, and successively delivered respectively into the buckets 36 on the index table 34 which are intermittently rotated in the direction indicated by the arrow D. Case caps 24 are also supplied in an array along the chute 46 from the case cap feeder 40.

Figure 10:
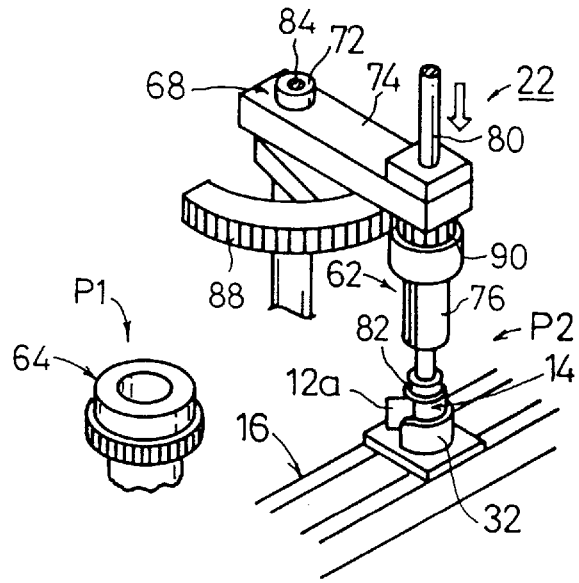
FIG. 10 is a fragmentary perspective view showing the film cartridge inserting mechanism when it is in a film cartridge removing position.

As shown in FIG. 3, the shaft 72 of the film cartridge inserting mechanism 22 is rotated about its own axis to position the swing arm 74 above the film cartridge 14 supported in one of the buckets 32 in the film cartridge removing position P2. Then, the suction cup 82 of the film cartridge holder 62 is lowered by the swing bar 86, and the vacuum source connected to the suction shaft 80 is actuated to enable the suction cup 82 to attract the film cartridge 14 in the bucket 32 under suction (see FIG. 10).

Figure 11:
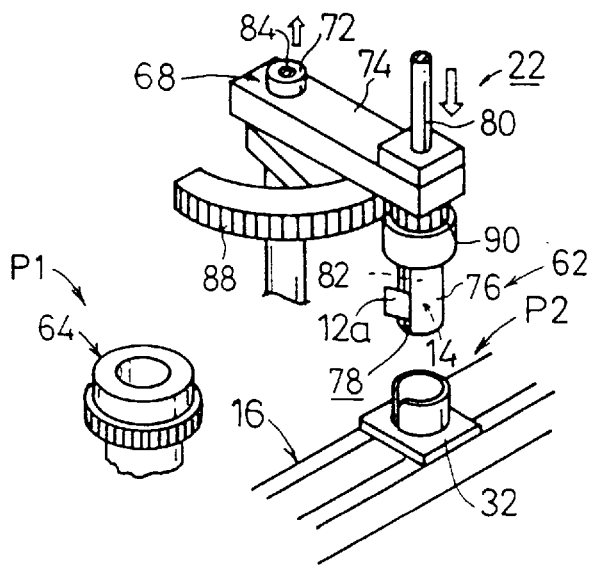
FIG. 11 is a fragmentary perspective view showing the manner in which a suction cup of the film cartridge inserting mechanism attracts a film cartridge.

The suction cup 82 which has attracted the film cartridge 14 is lifted by the swing bar 86 to move the film cartridge 14 from the bucket 32 into the vertical hollow cylinder 76. At this time, the film leader 12a of the photographic film 12 housed in the film cartridge 14 extends out of the vertical hollow cylinder 76 through the slit 78 (see FIG. 11).

The rotatable shaft 72 is rotated in the direction indicated by the arrow Al to angularly move the swing arm 74 to a position above the guide cylinder 64. Since the gear 90 on the upper end of the hollow cylinder 76 is in mesh with the sector gear 88 fixed to the support tube 70, when the swing arm 74 swings from the feed conveyor 30 to the index table 34, i.e., from the film cartridge removing position P2 to the assembling position P1, the hollow cylinder 76 rotates in unison with the gear 90 about its own axis in the direction indicated by the arrow B1, as shown in FIGS. 3 and 12.

Figure 12:
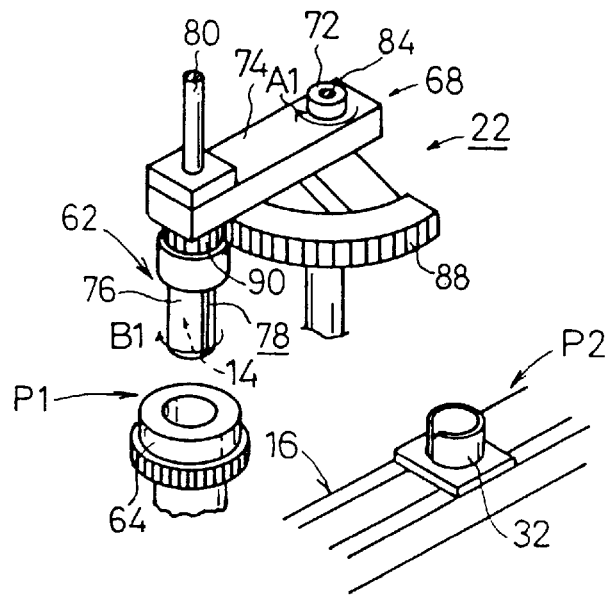
FIG. 12 is a fragmentary perspective view showing the film cartridge inserting mechanism when it is displaced to an assembling position.

Therefore, the film leader 12a extending out of the hollow cylinder 76 through the slit 78 is withdrawn into the hollow cylinder 76 through the slit 78, and wound around the outer circumferential surface of the film cartridge 14, as shown in FIG. 1 at (b) and FIG. 12.

Figure 13:
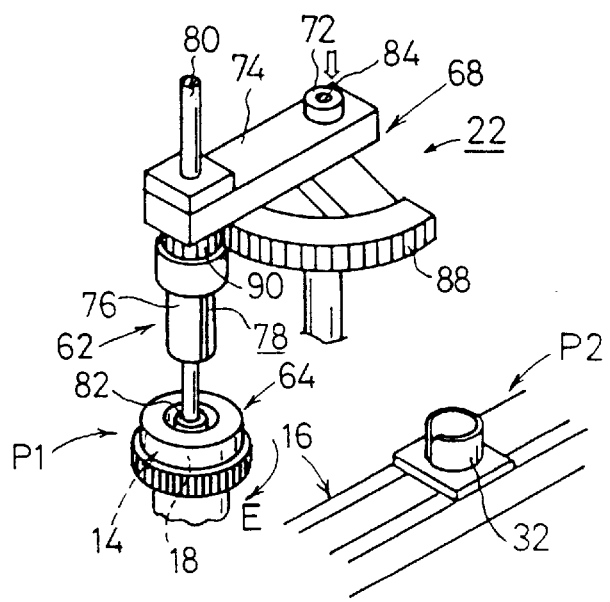
FIG. 13 is a fragmentary perspective view showing the manner in which the film cartridge is being passed through the guide cylinder by the film cartridge inserting mechanism.

In the assembling position P1, the guide cylinder 64 has been rotated clockwise in the direction indicated by the arrow E in FIG. 13 by the motor 92. The suction cup 82 with the attracted film cartridge 14 is lowered by the swing bar 86 until the film cartridge 14 is inserted downwardly into the guide cylinder 64. The film leader 12a wound around the film cartridge 14 is held on the outer circumferential surface of the film cartridge 14 by being guided by the downwardly tapered inner circumferential surface 96 of the guide cylinder 64 which is being rotated clockwise by the motor 92.

As shown in FIG. 6, a case 18 (see also FIG. 1 at (c)) placed in a bucket 36 on the index table 34 is positioned underneath the guide cylinder 64 in the assembling position P1. The suction base 104 of the case holder 60 is elevated into the bucket 36. Almost at the same time that the suction base 104 contacts the bottom of the case 18 in the bucket 36, the vacuum source connected to the suction shaft 106 is actuated to cause the suction cup 104 to attract and hold the case 18 under suction.

While the suction cup 104 is holding the case 18 nonrotatably, the suction cup 104 is further lifted to insert an upper portion of the case 18 into the upwardly tapered opening 100 of the guide cylinder 64, and holds the case 18 in the uppermost position in the upwardly tapered opening 100 (see FIG. 7). When the case 18 is lifted up to the uppermost position in the upwardly tapered opening 100, the film cartridge 14 which is held nonrotatably by the film cartridge holder 62 is lowered into the upwardly tapered opening 100 and inserted into the case 18, as shown in FIG. 13.

More specifically, as shown in FIG. 5, while the case 18 is being attracted and held nonrotatably by the case holder 60, the film cartridge 14 is held nonrotatably and lowered into the guide cylinder 64 by the film cartridge holder 62, and at the same time the guide cylinder 64 is rotated about its own axis in the direction indicated by the arrow E. Therefore, the film leader 12a projecting from the film cartridge 14 is reliably wound around the outer circumferential surface of the film cartridge 14 by the downwardly tapered inner circumferential surface 96 of the guide cylinder 64. Though the film cartridge 14 and/or the case 18 is not rotated, the film cartridge 14 can smoothly and reliably be inserted into the case 18 as the film leader 12a is securely held against the outer circumferential surface of the film cartridge 14 (see FIG. 1 at (d)). Since the film cartridge 14 can smoothly and reliably be inserted into the case 18, the film leader 12a does not rub the inner circumferential surface of the case 18 and hence does not scrape minute plastic particles or fragments off the inner circumferential surface of the case 18. Therefore, no minute plastic particles or fragments will be attached to the photographic film 12 housed in the film cartridge 14.

Furthermore, the packaging apparatus 10 is relatively simple in structure because it does not require mechanisms for rotating the case 18 and the film cartridge 14.

When the case 18 is placed on the case holder 60 is located in the uppermost position in the upwardly tapered opening 100, the upper end 18a of the case 18 is vertically spaced from the annular step 98 by the clearance S, as shown in FIG. 7. Therefore, during rotation of the guide cylinder 64, the case 18 is prevented from contacting and rotating with the guide cylinder 64. Since the case 18 does not rotate with the guide cylinder 64, the inner circumferential surface of the case 18 is not rubbed or frictionally contacted by the film leader 12a, and hence does not produce minute plastic particles or fragments.

If the clearance S were too small, the case 18 would possibly be brought into contact with the guide cylinder 64 due to variations of the uppermost position in which the case 18 may be stopped in the upwardly tapered opening 100, mechanical errors of related components of the packaging apparatus 10, or other causes. If the clearance S were too large, the film cartridge 14 or the film leader 12a wound around the film cartridge 14 would possibly be caught by the open end of the case 18, resulting in an unwanted cut in the photographic film 12 or a failure of the film cartridge 14 to be inserted into the case 18.

According to the illustrated embodiment, as described above, the clearance S is preferably in the range from 0.5 mm to 1.5 mm, and more preferably in the range from 0.5 mm to 1.0 mm. With the clearance S being in the above range, the case 18 is prevented from contacting and rotating with the guide cylinder 64, and hence the film cartridge 14 can be inserted smoothly and reliably into the case 18.

As described above, the downwardly tapered inner circumferential surface 96 of the guide cylinder 64 is inclined to the vertical axis of the guide cylinder 64 by an angle ranging from 1° to 11°. If the angle at which the downwardly tapered inner circumferential surface 96 is inclined to the vertical axis of the guide cylinder 64 were less than 10, the film leader 12a around the outer circumferential surface of the film cartridge 12 would strongly be rubbed by the downwardly tapered inner circumferential surface 96, and hence would easily be damaged thereby. If the angle were greater than 110, the film leader 12a around the outer circumferential surface of the film cartridge 12 would be deformed into a conical shape, easily applying a protective film on the photographic film 12 to the downwardly tapered inner circumferential surface 96 thereby to cause damage to the photographic film 12.

Furthermore, the case 18 has the radially inner round surface 102 which is convexly curved downwardly in the radially inward direction from the upper end 18a toward the inner circumferential surface of the case 18. The diameter D2 of the lower end of the radially inner round surface 102 is smaller than the diameter D1 of the lower end of the downwardly tapered inner circumferential surface 96, as shown in FIG. 7. Therefore, the film leader 12a projecting from the film cartridge 14 which is lowered by the film cartridge holder 62 can smoothly and easily be inserted along the radially inner round surface 102 into the case 18 in the assembling position P1.

If the diameter D1 of the lower end of the downwardly tapered inner circumferential surface 96 were smaller than the diameter D2 of the lower end of the radially inner round surface 102 (D1<D2), the film leader 12a projecting from the film cartridge 14 would be rubbed mostly strongly by the lower end of the downwardly tapered inner circumferential surface 96, easily applying a protective film on the photographic film 12 to the downwardly tapered inner circumferential surface 96 thereby to cause damage to the photographic film 12. However, since the diameter D1 is actually greater than the diameter D2, the film leader 12a projecting from the film cartridge 14 is kept out of contact wit the lower end of the downwardly tapered inner circumferential surface 96. Consequently, the protective film on the photographic film 12 is reliably prevented from being applied to the downwardly tapered inner circumferential surface 96 in the vicinity of its lower end, thus effectively avoiding damage to the photographic film 12. With the diameter D1 being greater than the diameter D2, furthermore, a deposit of dirt particles on the downwardly tapered inner circumferential surface 96 in the vicinity of its lower end is reliably prevented from entering the case 18.

When the film cartridge 14 is transferred from the guide cylinder 64 into the case 18, the film leader 12a may contact the radially inner round surface 102 on the upper end 18a of the case 18. However, since the film leader 12a tends to slip on the radially inner round surface 102, the radially inner round surface 102 is not strongly rubbed by the film leader 12a, and hence any plastic particles or fragments scraped off the radially inner round surface 102 and deposited in the case 18 are inappreciable in quantity.

After the film cartridge 14 has been inserted fully in the case 18, the suction cup 82 starts being elevated while at the same time ejecting air under pressure from the suction shaft 80 to the film cartridge 14, thus leaving the film cartridge 14 in the case 18. The suction cup 82 is displaced toward the first feed mechanism 16 by the displacing mechanism 68, and then picks up a next film cartridge 14 from the feed conveyor 30 in the film cartridge removing position P2.

The case 18 with the film cartridge 14 inserted therein is lowered in the bucket 36 in response to descending movement of the case holder 60. When the case 18 reaches the lower end of the bucket 36, the suction base 104 stops attracting and holding the case 18 under suction. The suction base 104 continuously descends, leaving the case 18 on lower end of the bucket 36, and stops in its lowermost position as shown in FIG. 6. The index table 34 of the second feed mechanism 20 is angularly moved to carry an empty case 18 to the position underneath the guide cylinder 64 below the assembling position P1, and hold the empty case 18 in that position.

As shown in FIG. 9, a foremost case 24 on the chute 46 is attracted under suction by the suction cup 126 of the case cap loading mechanism 48, and then placed on the case 18, which houses the inserted film cartridge 14, in the bucket 36 (see FIG. 1 at (e)). Then, the case cap installing mechanism 28 is actuated as shown in FIG. 8. Specifically, the horizontal arm 112 is lowered by the shaft 110 toward the index table 34, causing the presser 118 to press the case cap 24 downwardly under the bias of the spring 116 until the case cap 24 is snapped on the open end of the case 18 thereby to manufacture a packaged product 26 (see FIG. 1 at (f)).

According to the present invention, as described above, while a case is being held nonrotatably by the case holder, a film cartridge is held nonrotatably by the film cartridge holder and inserted into the case through the rotating guide cylinder, which guides the film cartridge to hold the film leader securely around the outer circumferential surface of the film cartridge. While the film cartridge is being inserted into the case, the film cartridge and the case do not need to be rotated, and the film leader and the inner circumferential surface of the case are not held in frictional contact with each other, so that no minute plastic particles or fragments will be scraped off the inner circumferential surface of the case. Furthermore, the packaging apparatus is relatively simple in structure because it does not require mechanisms for rotating the case and the film cartridge.

Although a certain preferred embodiment of the present invention has been shown and described in detail, it should be understood that various changes and modifications may be made therein without departing from the scope of the appended claims.

What is claimed is:

1. A method of packaging a film cartridge, comprising the steps of:

feeding a film cartridge with a rolled photographic film housed therein;

supplying a case to an assembling position;

holding and delivering said film cartridge to said assembling position and winding a film leader of the rolled photographic film which projects from said film cartridge, around an outer circumferential surface of said film cartridge; and while holding said film cartridge and said case nonrotatably, inserting said film cartridge into said case through a rotating guide cylinder which guides said film cartridge to hold said film leader around said outer circumferential surface of said film cartridge.

2. An apparatus for packaging a film cartridge, comprising:

a first feed mechanism for feeding a film cartridge with a rolled photographic film housed therein;

a second feed mechanism for supplying a case to an assembling position; and a film cartridge inserting mechanism for holding and delivering said film cartridge to said assembling position, winding a film leader of the rolled photographic film which projects from said film cartridge, around an outer circumferential surface of said film cartridge, and inserting said film cartridge into said case, said film cartridge inserting mechanism comprising:

case holding means for holding said case nonrotatably in said assembling position;

film cartridge holding means for holding said film cartridge nonrotatably and inserting said film cartridge into said case; and guide means having a guide cylinder for guiding said film cartridge therethrough into said case, said guide cylinder being rotatable to hold said film leader around said outer circumferential surface of said film cartridge.

3. An apparatus according to claim 2, wherein said guide cylinder has an inner circumferential surface for guiding said film leader along said outer circumferential surface of said film cartridge, a step joined to a lower end of said inner circumferential surface, and a tapered opening extending from said step for accommodating said case which is held by said case holding means while said case has an upper end spaced from said step by a predetermined clearance.

4. An apparatus according to claim 3, wherein said inner circumferential surface of said guide cylinder comprises a downwardly tapered inner circumferential surface which is inclined to the vertical axis of said guide cylinder by an angle ranging from 1° to 11°.

5. An apparatus according to claim 3, wherein said case includes a radially inner round surface which is curved downwardly in a radially inward direction from said upper end toward an inner circumferential surface of said case, said inner circumferential surface having a diameter at a lower end thereof which is greater than the diameter of a lower end of said radially inner round surface.

6. An apparatus according to claim 5, wherein said diameter of said inner circumferential surface at the lower end thereof is smaller than the outside diameter of said case.

7. An apparatus according to claim 2, wherein said case holding means has a vertically movable suction base for attracting said case and delivering the attracted case from said second feed mechanism to said assembling position, and said film cartridge holding means has a suction cup for attracting said film cartridge and inserting the attracted film cartridge into said case in said assembling position.

8. An apparatus according to claim 2, wherein said film cartridge inserting mechanism has displacing means for displacing said film cartridge holding means from a film cartridge removing position on said first feed mechanism to said assembling position.

9. An apparatus according to claim 2, further comprising a case cap installing mechanism for installing a case cap on an open end of said case with said film cartridge inserted therein.

* * * * *